United States Patent Office 3,414,378
Patented Dec. 3, 1968

3,414,378
PRODUCTION OF AMORPHOUS FERRIC OXIDE
Donald F. Stedman, Ottawa, Ontario, Canada, assignor to Canadian Patents and Development Limited, Ottawa, Ontario, Canada, a company of Canada
No Drawing. Filed Oct. 11, 1965, Ser. No. 494,946
13 Claims. (Cl. 23—200)

ABSTRACT OF THE DISCLOSURE

A process for the production of highly amorphous ferric oxide in which ferrous oxalate is formed and spread as a thin layer on a supporting surface acting as a heat sink. The temperature of the thin layer is controlled to be below the temperature of crystalline formation and the ferrous oxalate decomposes directly to a highly amorphous form of ferric oxide.

---

This invention relates to a highly amorphous form of ferric oxide and to a process for its production.

Known methods for the production of ferric oxide, commonly termed rouge, have resulted in a powder which, although very fine, is essentially crystalline. This is shown by the fact that X-ray analysis of such powder produces a diffraction pattern characteristic of crystal structure. The phrase "highly amorphous powder" is used in this specification to denote a powder which, when subject to X-ray analysis, displays essentially no characteristic diffraction pattern, the "powder diagram" giving a strip of photographic film almost evenly blackened throughout, with only the slightest increase in intensity around locations indicating the α crystal state, and with no tendency towards any other pattern or sharp lines at any point. It will be appreciated that this result of X-ray analysis indicates a unique degree of fine amorphous subdivision for ferric oxide which has previously been obtained only as a definitely crystalline material.

It is an object of this invention to produce ferric oxide powder in this highly amorphous form.

It is a further object of this invention to provide a process for producing highly amorphous ferric oxide powder.

The amorphous ferric oxide powder of this invention is produced by reacting ammonium oxalate with a soluble ferrous salt, conveniently the sulphate to produce a ferrous oxalate precipitate which is then washed and baked under carefully controlled conditions to ensure that its decomposition takes place at temperatures below the temperature at which crystalline ferric oxide is formed. The soluble ferrous salt is one which forms water soluble salts with the ammonium oxalate and leaves no metallic residue; salts such as the sulphate, nitrate and chloride are suitable. An essential feature of the invention is that the ferrous oxalate is arranged in the form of a thin coherent film on a surface having a thermal mass large with respect to the film. This results in the temperature of the film being maintained below the temperature of crystalline formation despite the relatively large heat of decomposition of ferrous oxalate, which is of the order of 50,000 cals. per mol.

Typical uses for the highly amorphous ferric oxide powder produced in accordance with this invention include that of a superfine polishing agent for, by way of example, optical glass, metallic objects, jewel bearings and crystals, the powder being sufficiently soft and fine to be useful for polishing even plastics. The powder is also useful as a thickening agent in oils and grease and a pigment in paints and inks. Contrary to the paramagnetic property of crystalline α ferric oxide, the amorphous powder of this invention is slightly ferromagnetic, although by chemical analysis it contains no ferrous oxide which could provide molecular orientation in the magnetic configuration, the totally random aggregation of the amorphous state presumably providing some molecular juxtapositions allowing a magnetic property. Since the powder is electrically insulating the magnetic property is useful even at high frequencies.

In the process for the preparation of the highly amorphous ferric oxide, ammonium oxalate solution is added to a ferrous sulphate solution; and the ferrous oxalate precipitate is washed and by this invention thinly spread on a supporting surface to occupy at least 1.5 square centimeters of area per 1 g. of ferrous sulphate used and, preferably, 4 square centimeters per 1 g. of ferrous sulphate used.

The precipitate is then drained of any excess wash liquid, and placed in uncontaminated air in an oven at a temperature between 140° C. and 150° C. Care is taken that the precipitate remains in the form of a thin coherent film or cake. In particular bubble formation, which might disrupt such a film, is not permitted to occur.

The temperature of the oven is then raised at a rate preferably less than 1° C. per minute until the decomposition temperature of the ferrous oxalate is reached. The commencement of active decomposition of the ferrous oxalate is shown by a darkening in colour of the precipitate. Different batches of even reagent grade chemicals yield precipitates having slightly different decomposition temperatures occurring in the range 170° C. to 190° C. and slightly different colored products. Under no circumstances is the temperature of the ferrous oxalate raised above 195° C., this assures that the conditions for the formation of crystalline ferric oxide do not occur.

The arrangement of the precipitate as an undisturbed thin coherent film results in the heat of decomposition of the ferrous oxalate being rapidly conducted to the supporting surface thereby avoiding any important rise in temperature of the ferrous oxalate over the temperature of the oven. This condition can be maintained only with a thin film of the oxalate since if the film is too thick there is insufficient thermal conductivity through the film to prevent the top layer of oxalate from overheating. It has been found that if the oxalate from 1 g. of ferrous sulphate is arranged on an area less than 1.5 square centimeters this overheating of the top layer of oxalate will take place. At this latter rate of surface loading the supporting surface, whether metal or glass, should be at least 0.1 inch thick in order safely to absorb the heat of decomposition of the oxalate. At the lower rate of surface loading (4 square centimeters per 1 g.) previously mentioned a supporting surface at least 0.05 inch thick is adequate.

It has not been found that there is any marked difference between the use of glass or metallic supporting surfaces since the greater mass and thermal conductivity of metals is offset by their lower specific heat. In any case, the decomposition of ferrous oxalate, as controlled by the process of this invention, is slow and the heat of reaction is liberated gradually so that a glass supporting surface has adequate thermal conductivity for its proper absorption and dispersal.

If the decomposition of ferrous oxalate is carried out by heating the material in bulk, as opposed to heating a thin film, the process is rapid, the powder attaining a much higher temperature than the oven and often glowing visibly. In contrast, the process of this invention results in much slower decomposition requiring about 30 minutes for completion.

The resultant powder is highly amorphous ferric oxide having a particle size in the Angstrom region but displaying agglomeration as a soft, fine, granular powder. It is so fine that, contrary to the property of known ferric oxides, it is quite hygroscopic, absorbing appreciable amounts of moisture from the air.

The above described basic process for the production of highly amorphous ferric oxide may be modified by the inclusion of several additional steps. These are the steps of using an excess of ammonium oxalate in the preparation of the ferrous oxalate; the step of adding the excess ammonium oxalate very quickly and stirring strongly so that the reagent is added and fully mixed before precipitation starts; the step of dissolving ferric oxalate in the last wash water for the ferrous oxalate; and the step of adding some previously produced amorphous ferric oxide to the ferrous oxalate at or prior to the last wash.

The step of baking the ferrous oxalate in the form of a thin film is an essential feature of this invention. The four additional steps detailed above are not essential to the process but do assist its operation.

The first additional step, that of adding excess ammonium oxalate, provides that in the formation of the precipitate the organic decomposable ion is present in excess assisting in the amorphous dispersion of the ferrous, non-decomposable ion. The second additional step, that of very quick addition and stirring of the ammonium oxalate, ensures that the whole of each grain of precipitate is formed under conditions of excess oxalate. The third additional step, that of adding a small amount of ferric oxalate to the ferrous oxalate precipitate before baking, provides on the grains of precipitate a trace of a less stable form of iron oxalate assisting the initiation of decomposition at relatively low temperatures. The fourth additional step, that of adding some previously produced amorphous ferric oxide to the ferrous oxalate precipitate, provides nuclei on which the decomposition can start. Each of these steps assists in the uniformity of the product and permits its production at lower temperatures thus ensuring that its temperature of formation is further removed from the temperature at which crystalline ferric oxide is formed. The amount of ferric oxalate and oxide added at the last wash are quite unimportant, as little as 0.1% of the oxalate and 1% of the oxide are quite effective.

If all four of the above-noted additional steps are included in the process of this invention then it is found that the decomposition temperature is lowered sufficiently to remove the requirement for slow heating of the oxalate film. The thin film of moist oxalate may be placed directly in an oven at its decomposition temperature. This temperature varies slightly with different batches, even from highly purified chemicals, but may be as low as 160° C. for complete decomposition giving a temperature safety margin of 35° C. below the temperature at which crystalline ferric oxide would be formed. Because of this depression of the temperature of decomposition it is possible to bake the precipitate for up to one hour without the resultant powder losing its amorphous structure.

The following examples are illustrative of the process of this invention.

Example I 1,000 cc. distilled water had 0.5 g. oxalic acid dissolved in it. To this was added 208.5 g. $FeSO_4 \cdot 7H_2O$. In another container 1500 cc. distilled water had an equivalent quantity, i.e., 106.3 g. of $(COONH_4)_2 \cdot H_2O$ dissolved in it by warming slightly. Both solutions were filtered to remove any residue or cloudiness.

The ammonium oxalate solution was added to the ferrous sulphate solution with stirring and the resulting precipitate was washed three times with distilled water and thinly spread as a film on the surface of "Pyrex" dishes to occupy 1,000 square centimeters. ("Pyrex" is a registered trademark for heat resistant glassware.) The precipitate was allowed to drain as dry as possible and was then placed in an oven at a temperature of 150° C. without disturbing the coherence of the film or its contact with the "Pyrex" surface. When the damp film had dried the temperature of the oven was then slowly raised to 190° C. at a rate of temperature rise less than 1° C. per minute, and maintained at 190° C. for thirty minutes.

The resultant product comprised 60 g. of highly amorphous ferric oxide.

Example II

The process of Example I was carried out using 117 g. of ammonium oxalate in solution instead of 106.3 g. That is, 10% excess ammonium oxalate was used. The resultant product comprised 60 g. of highly amorphous ferric oxide.

Example III

The process of Example II was carried out ensuring that the ammonium oxalate was added very quickly to the ferrous sulphate solution with immediate strong stirring so that mixing was complete before the start of precipitation. The resultant product comprised 60 g. of highly amorphous ferric oxide.

Example IV

A ferrous oxalate precipitate was produced in the manner described in Example I. To the third wash of about 500 cc. of distilled water was added 5 cc. of 5% ferric oxalate, adjusted with freshly precipitated ferric hydroxide and oxalic acid to a pH between 3.0 and 4.0. The mixture was thinly spread as a film on the surface of "Pyrex" dishes to occupy 1,000 square centimeters and allowed to drain as dry as possible.

The mixture was then placed in an oven at a temperature of 150° C. and the temperature of the oven was raised to 170° C. at a rate of temperature rise less than 1° C. per minute, and maintained at 170° C. for one hour. The resultant product comprised 60.1 g. of highly amorphous ferric oxide.

Example V

A ferrous oxalate precipitate was produced in the manner described in Example I. Prior to the third wash of the precipitate 0.7 g. of previously obtained ferric oxide was added and dispersed throughout the ferrous oxalate with the third wash. The mixture was thinly spread as a film on the surface of "Pyrex" dishes to occupy 1,000 square centimeters and allowed to drain as dry as possible.

The mixture was then placed in an oven at a temperature of 150° C. without disturbing the coherence of the film or its contact with the "Pyrex" surface. When the damp film had dried, the temperature of the oven was then raised to 170° C. at a rate of temperature rise less than 1° C. per minute, and maintained at 170° C. for one hour.

The resultant product comprised 60.7 g. of highly amorphous ferric oxide.

Example VI

A ferrous oxalate precipitate was produced in the manner described in Example III. Prior to the third wash of the precipitate 0.7 g. of previously obtained ferric oxide was added and dispersed throughout the ferrous oxalate with the third wash. The solution for the third wash was obtained by dissolving sufficient ferric oxalate in distilled water to give a pH of 3.0. The mixture was thinly spread as a film on the surface of "Pyrex" dishes to occupy 1,000 square centimeters and allowed to drain as dry as possible.

The mixture was then placed in an oven at a temperature of 165° C. and baked for one hour. The resultant product comprised 60.7 g. of highly amorphous ferric oxide.

It has also been found that the amorphous ferric oxide powder can be controlled in colour by the addition of various substances to the precipitated ferrous oxalate prior to its decomposition. For example, if oxalic acid is present in the third wash the resulting powder has a redder shade than would otherwise be the case. If the film or precipitate is spread even more thinly than illustrated in the above examples, then the resulting powder is blacker than would otherwise be the case. This controllable variation in colour gives the amorphous ferric oxide utility as a stable mineral pigment.

A further use of the highly amorphous ferric oxide of this invention is as a catalyst base. A suitable catalytic compound may be added to the solutions prior to the precipitation of the ferrous oxalate and be partially carried down with the precipitate. Carrying out the remainder of the process as hitherto disclosed results in the amorphous ferric oxide mixture displaying a large effective area of catalyst surface.

It will be clear that the process of this invention is not limited to the exact form herein described and that variations may be made from the preferred embodiment of the invention without departing from the spirit and scope of this invention which is set forth in the appended claims. In particular, the process could be carried out by means of a drum dryer, or a moving series of bars, wires or plates dipping into a slurry of the oxalate or any other distribution system and passing through a drying tunnel. Any such drying process arranging the oxalate as a thin film and baking at suitable temperatures without disturbing the state of coherence is suitable. It may also be convenient to carry out the precipitation of the oxalate as a continuous process.

I claim:
1. A process for producing amorphous ferric oxide comprising the steps of,
   reacting ammonium oxalate with a water-soluble ferrous salt having non-metallic anions to produce ferrous oxalate,
   isolating and drying the ferrous oxalate in the form of a thin coherent film occupying the equivalent of at least about 1.5 sq. cm. per gram of ferrous salt on a supporting surface, the depth of said film permitting heat produced in its outer layer to be readily conducted to said supporting surface,
   heating the ferrous oxalate while maintained in contact with said surface,
   controlling said heating to achieve decomposition of said oxalate at a temperature in the range 170°–190° C., and
   baking said ferrous oxalate at said decomposition temperature for a time not in excess of about one hour.

2. The process as set forth in claim 1, wherein said soluble ferrous salt is ferrous sulphate.

3. A process for producing amorphous ferric oxide comprising the steps of,
   reacting ammonium oxalate with ferrous sulphate to produce ferrous oxalate,
   isolating and drying the ferrous oxalate in the form of a thin coherent film occupying the equivalent of at least about 1.5 sq. cm. per gram of ferrous sulphate on a supporting surface, the depth of said film permitting heat produced in its outer layer to be readily conducted to said supporting surface.
   heating the ferrous oxalate while maintained in contact with said surface from a temperature less than 160° C. to a temperature in the range of 170° C. to 190° C., at which decomposition of said ferrous oxalate occurs.
   baking said ferrous oxalate at said decomposition temperature for a time not in excess of about one hour.

4. The process as set forth in claim 3, wherein the ferrous oxalate is heated up to and baked at a temperature of 190° C.

5. The process as set forth in claim 3, wherein excess ammonium oxalate is reacted with said ferrous sulphate accompanied by vigorous mixing.

6. A process for producing amorphous ferric oxide comprising the steps of,
   reacting ammonium oxalate with ferrous sulphate to produce ferrous oxalate,
   isolating and drying the ferrous oxalate in the form of a thin coherent film occupying the equivalent of at least about 1.5 sq. cm. per gram of ferrous sulphate in contact with a surface of thermal capacity large with respect of that of said film,
   heating the ferrous oxalate while maintained in contact with said surface from a temperature less than 160° C. to a temperature in the range 170° C. to 190° C., at which decomposition of said ferrous oxalate occurs,
   said heating being at a rate of temperature rise less than 1° C. per minute, and
   baking said ferrous oxalate at said decomposition temperature for a time not in excess of about one hour.

7. The process as set forth in claim 6, wherein the ferrous oxalate is heated up to and baked at a temperature of 190° C.

8. A process for producing amorphous ferric oxide comprising the steps of:
   reacting ammonium oxalate with ferrous sulphate to produce ferrous oxalate,
   isolating said ferrous oxalate,
   adding amorphous ferric oxide in an amount less than 1% by weight of said ferrous sulphate to said ferrous oxalate to form a mixture,
   spreading said mixture as a thin coherent film occupying the equivalent of at least about 1.5 sq. cm. per gram of ferrous sulphate in contact with a surface of thermal mass large with respect to said film,
   drying said mixture while maintaining the coherence of said film,
   heating said mixture from a temperature less than 160° C. to a temperature in the range of 160° C. to 180° C. at which decomposition of said ferrous oxalate occurs, said heating being at a rate of temperature rise less than 1° C. per minute,
   baking said mixture at said decomposition temperature for a time not exceeding one hour.

9. The process as set forth in claim 8, wherein said mixture is heated up to and baked at a temperature of 170° C.

10. A process for producing amorphous ferric oxide comprising the steps of,
    reacting ammonium oxalate with ferrous sulphate to produce ferrous oxalate,
    isolating said ferrous oxalate,
    washing said ferrous oxalate with a solution of ferric oxalate having a pH in the range 3.0 to 4.0,
    spreading said washed ferrous oxalate as a thin coherent film occupying the equivalent of at least about 1.5 sq. cm. per gram of ferrous sulphate in contact with a surface of thermal mass large with respect to that of said film,
    drying said ferrous oxalate while maintaining the coherence of said film,
    heating said ferrous oxalate from a temperature less than 160° C. to a temperature in the range of 160° C. to 180° C. at which decomposition of said ferrous oxalate occurs, said heating being at a rate of temperature rise less than 1° C. per minute,
    baking said ferrous oxalate at said decomposition temperature for a time not exceeding one hour.

11. The process as set forth in claim 10, wherein said ferrous oxalate is heated up to and baked at a temperature in the range of 165–170° C.

12. A process for producing amorphous ferric oxide comprising the steps of,
    adding excess ammonium oxalate to ferrous sulphate accompanied by vigorous mixing,
    isolating the precipitated ferrous oxalate,
    adding amorphous ferric oxide in an amount less than 1% by weight of said ferrous sulphate to said ferrous oxalate to form a mixture,
    washing said mixture with a solution of ferric oxalate having a pH of approximately 3.0, spreading said mixture as a thin coherent film occupying the equivalent of at least about 1.5 sq. cm. per gram of ferrous sulphate in contact with a surface of thermal mass large with respect to said film,
draining said wash solution from said film,
baking said mixture at a temperature between 160° C. and 180° C. for a time not exceeding one hour to decompose said ferrous oxalate.

13. A process as defined in claim 12, wherein said mixture is baked at a temperature in the range 165–170° C.

References Cited

UNITED STATES PATENTS

| | | | |
|---|---|---|---|
| 1,496,605 | 6/1924 | Saunders | 23—200 X |
| 1,501,873 | 7/1924 | Tyrer | 23—200 X |
| 2,156,904 | 5/1939 | Ruthruff | 23—200 X |
| 2,636,892 | 4/1953 | Mayer. | |

OTHER REFERENCES

Mellor (I–III): "Comprehensive Treatise on Inorganic and Theoretical Chemistry," vol. 13, Longmans, Green and Co., N.Y., 1934, pp. 808, 779 and 791, respectively.

Welo et al.: "Chemical Reviews," vol. 15, August 1934, p. 59.

OSCAR R. VERTIZ, *Primary Examiner.*

G. T. OZAKI, *Assistant Examiner.*